United States Patent
Spero et al.

(10) Patent No.: US 7,205,043 B1
(45) Date of Patent: Apr. 17, 2007

(54) PRESSURE RESISTANT ANECHOIC COATING FOR UNDERSEA PLATFORMS

(75) Inventors: Arthur C. Spero, Front Royal, VA (US); Carlos M. Godoy, Middletown, RI (US); Azriel Harari, Middletown, RI (US); James M. Teague, Norfolk, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 337 days.

(21) Appl. No.: 10/923,162

(22) Filed: Aug. 9, 2004

(51) Int. Cl.
*D04H 1/00* (2006.01)
*B32B 3/26* (2006.01)
*H04R 25/00* (2006.01)
*E04B 9/00* (2006.01)

(52) U.S. Cl. .............. 428/292.1; 428/304.4; 428/297.4; 381/322; 181/284

(58) Field of Classification Search ........... 181/284; 428/297.4, 372, 370, 292.1, 304.4; 381/322
See application file for complete search history.

(56) References Cited

U.S. PATENT DOCUMENTS

| | | | |
|---|---|---|---|
| 3,698,993 A | 10/1972 | Rauh | |
| 4,811,402 A * | 3/1989 | Ward | 381/322 |
| 4,851,271 A * | 7/1989 | Moore et al. | 428/34.5 |
| 4,874,640 A * | 10/1989 | Donzis | 427/512 |
| 4,956,393 A * | 9/1990 | Boyd et al. | 521/54 |
| 5,400,296 A | 3/1995 | Cushman et al. | |
| 5,420,825 A | 5/1995 | Fischer et al. | |
| 5,444,668 A | 8/1995 | Sevik | |
| 5,745,434 A | 4/1998 | Cushman | |
| 6,346,314 B1 * | 2/2002 | Chaumel et al. | 428/195.1 |
| 6,517,774 B1 * | 2/2003 | Bray et al. | 419/65 |

* cited by examiner

*Primary Examiner*—N. Edwards
(74) *Attorney, Agent, or Firm*—James M. Kasischke; Michael P. Stanley; Jean-Paul A. Nasser

(57) ABSTRACT

A composite material containing inclusions of spherical shells in which each spherical shell encapsulates a rubber core with ferrite loading. The inclusions are embedded in a matrix material of syntactic foam. The spherical shells are made from glass and therefore acoustically transparent and in combination with the cores are statically stiffer than the surrounding matrix material. The composite material with the matrix material and inclusions allows the composite material to be acoustically dissipating with a stiffness in which the energy of forces associated with undersea platforms is resisted.

6 Claims, 1 Drawing Sheet

PRESSURE RESISTANT ANECHOIC COATING FOR UNDERSEA PLATFORMS

STATEMENT OF GOVERNMENT INTEREST

The invention described herein may be manufactured and used by or for the Government of the United States of America for Governmental purposes without the payment of any royalties thereon or therefore.

BACKGROUND OF THE INVENTION (1) Field of the Invention

The invention relates to anechoic composites as a coating or as a component of a structural element for use on undersea platforms.

(2) Description of the Prior Art

Presently, noise control technology for undersea vehicles includes external coatings in which the coatings absorb probing undersea sound waves produced by sonar transducers and thereby echoes of the undersea sound waves are minimized to prevent active detection of the undersea vehicles.

In Rauh (U.S. Pat. No. 3,698,993), a foamed closed cell sheet elastomeric material with particulate material distributed there through is disclosed. The particulate material is composed of high density particles of variegated sizes and shapes. The high density particles preferably have a specific gravity and are extruded. The particles are of irregular heterogeneous shape as distinguished from regular geometric shapes or patterns.

In Fischer et al. (U.S. Pat. No. 5,420,825), a composite for use on submarines and surface craft for controlling self-generated noise is disclosed. The composite includes two layers of $PVF_2$ transducers separated by a layer of phase shifting or absorbing material. The inner transducer senses noise from the ship and subtracts this from the signal from the outer transducer representing noise plus the desired signal. In a second mode, the sensed noise is regenerated through the outer transducer 180 degrees out-of-phase to cancel the noise and allow more accurate detection.

In Cushman et al. (U.S. Pat. No. 5,400,296), an acoustic attenuation and vibration damping material is disclosed. Embedded within the material are high and/or low characteristic acoustic impedance particles in which the particles are mismatched to allow some portion of the impinging acoustic or vibratory energy to be reflected.

In Sevik (U.S. Pat. No. 5,444,668), an anechoic and decoupling coating for use on an underwater structure is disclosed. The coating is an elastomeric matrix containing sealed air-filled cavities as well as random labyrinths of small water-filled passages running throughout and in open communication with a surface facing the water. Acoustic waves incident upon the water-facing surface cause time varying shear and bulk deformations within the matrix. As a result of these deformations, acoustic energy is dissipated by hysteretic damping of the elastomeric matrix as well as by viscosity due to water movement to and fro within the passages and into and out of the matrix.

In Cushman (U.S. Pat. No. 5,745,434), an acoustic or damping material is disclosed. The material is produced by mixing at least two species of particles into the material in order to produce the material with tortuous passageways. The particle species are of crumb tire rubber from used tires.

The problem with presently used noise control technologies is that their acoustic properties deteriorate due to the large deformation of the rubber particles or other acoustic impedance particles under the depth and shock pressures associated with undersea operations. As such a composite material as a noise control technology may be acceptable for sound absorption at one hydrostatic pressure or temperature and less effective at another. Additionally, presently used composites may collapse under shock pressure due to the large shear deformation of the rubber particles.

SUMMARY OF THE INVENTION

Accordingly, it is an object of the present invention to provide an anechoic composite material that can serve as a coating on a hull of an undersea vehicle.

It is a further object of the present invention to provide a composite material for absorbing acoustic energy.

It is a still further object of the present invention to provide a composite material for an undersea platform that absorbs acoustic energy directed toward the platform from an external source and thereby camouflages the existence of the platform.

It is a still further object of the present invention to provide a composite material that is resistant to deterioration due to the depth and shock pressures associated with undersea operations.

It is a still further object of the present invention to provide a composite material that is potentially insensitive to deterioration due to the depth and shock pressures associated with undersea operations.

It is a still further object of the present invention to provide a composite material with anechoic properties that can serve as a component of a structural element of a submarine sail.

In order to attain the objects described, there is provided a composite material composed of a syntactic foam matrix with inclusions of glass spherical shells embedded in the matrix in which each of the shells encapsulate a dynamically-active rubber core. The glass spherical shells are acoustically transparent at frequencies of interest and with their relatively small wall thickness cause only a slight modification to the resonance of the inclusions. The resonance of the rubber core with ferrite loading in combination with the matrix material dissipates acoustic energy directed toward the composite material.

Since the spherical shells are statically stiffer than the surrounding matrix material, the shells shield their encapsulated cores from background pressure and thereby allow a lower shear modulus for the cores. A lower shear modulus allows the use of the rubber-like core. The stiffness and spherical shape of the inclusions also make the composite material resistant to pressure and substantially increases the shock resistance of the composite material. As a result, a composite material is disclosed that will dissipate the power of an incoming sea wave and is resistant to undersea pressures as well as being able to dissipate acoustic energy.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawing wherein.

DESCRIPTION OF THE PREFERRED EMBODIMENTS

Figure 1:
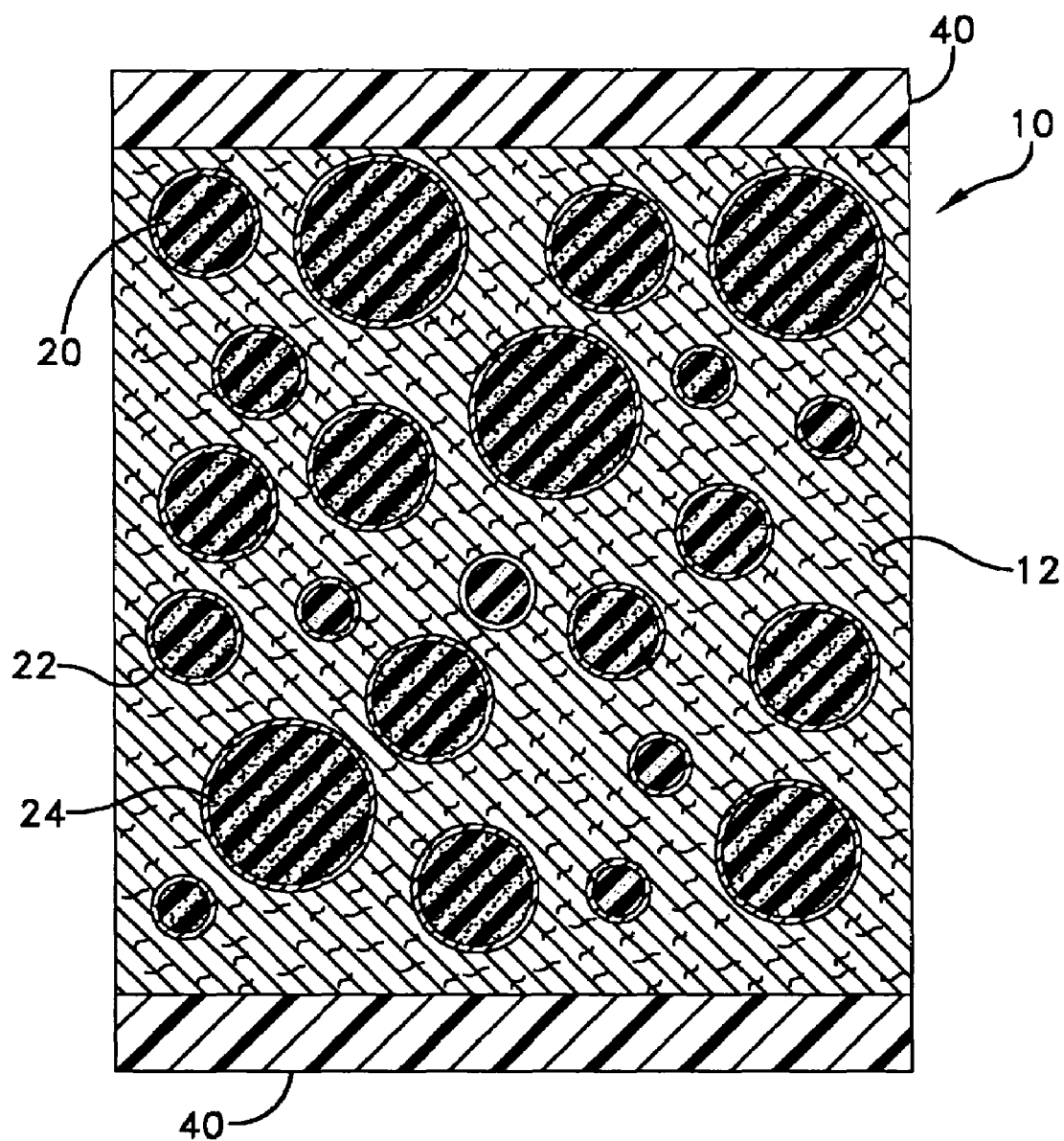
FIG. 1 is a cross-sectional view of the composite material of the present invention.

Referring now to the drawing wherein like numerals refer to like elements throughout the view, one sees that FIG. 1 depicts a composite material 10 of the present invention in which the composite material is contained by plates 40. The plates 40 are preferably fiberglass or an alternate composite material known to those skilled in the art. The combination of the plates 40 with the composite material 10, shown in the figure, can be used as a structural element such as a panel or shell used in the construction of an undersea vehicle (not shown).

The composite material 10 comprises a matrix material 12 having inclusions 20 of spherical shells 22 in which each shell encapsulates a dynamically-active core 24. The spherical shells 22 are preferably made of glass; however, any suitable substitute known to those skilled in the art may be used.

The core 24 is preferably TECHTHANE or a similar material known to those skilled in the art in which the core has rubber-like properties and is ferrite loaded (a particle species of iron). Ferrite loading or the uses other heavy loading metals strengthen the core 24 and enhance the pass-through acoustic qualities of the core. The rubber properties of the core 24 contribute to a comparatively low weight of the composite material 10.

The matrix material 12 is preferably formed from syntactic foam containing a majority of voids in which the matrix material has the properties of a rigid plastic as well as a suitable anechoic material. The preferred density for the syntactic foam is 1.12 kg/m$^3$ with the bulk modulus of $2.0 \times 10^9$ Pascal. The matrix material 12 along with the inclusions 20 is resistant to the high depth pressures and shock pressures associated with the operations of a submarine or undersea vehicle.

Acoustic absorption is enhanced by the maximum packing of the inclusions 20 in the matrix material 12, preferably with the total volume of the inclusions being greater than that of the matrix material. As a construction component of an undersea vehicle, the packing of the shells 22 in the matrix material 12 would be between the plates 40. Alternatively, the composite material 10 may be spread and cured on a backing material or a sheet material (not shown) as a construction component. In either situation similar-sized inclusions 20 may be used to lower the overall cost of the composite material 10.

The advantages of the present invention are that the composite material 10 is relatively insensitive to changing water pressure and incoming shock pressures while maintaining anechoic properties.

There has been described one embodiment of the present invention. It will be obvious that various modifications and deviations may be made from this disclosure without departing from the substance of the invention which is defined by and limited only in the claims amended hereto.

What is claimed is:

1. A composite material capable of absorbing acoustic energy, said composite material comprising:

a matrix material capable of securing to a surface as a coating, said matrix material formed as a syntactic foam containing a majority of voids with said syntactic foam having a density of 1.12 kg/m$^3$ with a bulk modulus of $2.0 \times 10^9$ Pascal; and a plurality of spherical shells incorporated into said matrix material, each of said spherical shells encompassing an acoustically dissipating core material of ferrite loaded rubber.

2. The composite material in accordance with claim 1 wherein a total volume of said spherical shells is greater than a remaining volume of said matrix material.

3. The composite material in accordance with claim 2 wherein each of said spherical shells is acoustically transparent.

4. The composite material in accordance with claim 3 wherein each spherical shell of said plurality of spherical shells is equal in size to another spherical shell of said plurality of spherical shells.

5. The composite material in accordance with claim 2 wherein each of said spherical shells is glass.

6. The composite material in accordance with claim 5 wherein each spherical shell of said plurality of spherical shells is equal in size to another spherical shell of said plurality of spherical shells.

* * * * *